US008792903B2

(12) United States Patent
Ische et al.

(10) Patent No.: US 8,792,903 B2
(45) Date of Patent: Jul. 29, 2014

(54) TRAJECTORY-BASED LOCATION DETERMINATION

(75) Inventors: Marc A. Ische, San Diego, CA (US); Leonid Sheynblat, Hillsborough, CA (US); Douglas Neal Rowitch, Del Mar, CA (US)

(73) Assignee: QUALCOMM Incorporated, San Diego, CA (US)

( * ) Notice: Subject to any disclaimer, the term of this patent is extended or adjusted under 35 U.S.C. 154(b) by 381 days.

(21) Appl. No.: 12/689,146

(22) Filed: Jan. 18, 2010

(65) Prior Publication Data

US 2010/0331010 A1 Dec. 30, 2010

Related U.S. Application Data

(60) Provisional application No. 61/221,981, filed on Jun. 30, 2009.

(51) Int. Cl.
*H04W 24/00* (2009.01)

(52) U.S. Cl.
USPC .................. 455/456.1; 455/404.2; 455/456.6; 340/539.13; 701/469; 701/472

(58) Field of Classification Search
USPC ......... 455/404.2, 456.1, 456.6; 701/469, 472; 340/539.13
See application file for complete search history.

(56) References Cited

U.S. PATENT DOCUMENTS

| | | | |
|---|---|---|---|
| 6,240,368 B1 | 5/2001 | Kreft | |
| 6,308,134 B1 * | 10/2001 | Croyle et al. | 701/472 |
| 6,456,211 B2 * | 9/2002 | Wu et al. | 341/120 |
| 6,571,173 B1 * | 5/2003 | Joshi | 701/446 |
| 2007/0010940 A1 | 1/2007 | Tan et al. | |
| 2007/0072158 A1 | 3/2007 | Unuma et al. | |
| 2008/0102786 A1 * | 5/2008 | Griffin | 455/404.2 |
| 2008/0102856 A1 * | 5/2008 | Fortescue et al. | 455/456.1 |
| 2009/0046005 A1 * | 2/2009 | Namineni et al. | 342/357.07 |
| 2009/0157259 A1 | 6/2009 | Han et al. | |
| 2012/0020522 A1 * | 1/2012 | Soderstrom | 382/103 |

FOREIGN PATENT DOCUMENTS

| | | |
|---|---|---|
| JP | 2007093433 A | 4/2007 |
| TW | 200910913 A | 3/2009 |
| WO | WO2009021068 | 2/2009 |

OTHER PUBLICATIONS

International Search Report and Written Opinion—PCT/US2010/040654, International Searching Authority—European Patent Office, Nov. 4, 2010.
Northrop Grumman, LN-100G Inertial Navigation System with Embedded GPS, 2010. http://www.es.northropgrumman.com/by_capability/militaryaviation/navigation/navigationgrade/.
Wikipedia, "Inertial navigation system", document last modified on Dec. 22, 2009, Retrieved from: http://en.wikipedia.org/wiki/Inertial_navigation.
Taiwan Search Report—TW099121524—TIPO—Jan. 18, 2013.

* cited by examiner

*Primary Examiner* — Justin Lee
(74) *Attorney, Agent, or Firm* — Howard Seo (57) ABSTRACT

The subject matter disclosed herein relates to determining a location of a mobile device using an estimated trajectory of motion of the mobile device, and in particular, using a comparison of the estimated trajectory with one or more predetermined candidate trajectories.

26 Claims, 5 Drawing Sheets

TRAJECTORY-BASED LOCATION DETERMINATION

CLAIM OF PRIORITY UNDER 35 U.S.C. §119

The present application claims priority to Provisional Application No. 61/221,981 entitled "Trajectory-Based Location Determination" filed Jun. 30, 2009, is commonly owned by the assignee hereof and is and incorporated herein by reference.

BACKGROUND

1. Field

The subject matter disclosed herein relates to estimating a location of a mobile device using an estimated trajectory of motion.

2. Information

A satellite positioning system (SPS), such as the Global Positioning System (GPS), typically comprises a system of earth orbiting satellite vehicles (SV's) enabling wireless devices, such as cellular telephones, personal communication system (PCS) devices, and other mobile devices to determine their location on the earth based, at least in part, on signals received from the SV's. Such wireless devices may be equipped with an SPS receiver and be capable of processing SV signals to determine location. However, such a wireless device may be located in a radio-frequency (RF) environment, such as inside a building that does not allow the wireless device to acquire SPS signals. Furthermore, such an RF environment may also prevent communication between the wireless device and entities outside the RF environment, such as cellular towers and/or wireless transmitters, for example. Accordingly, a wireless device may lack a capability to determine its location based on receipt of SPS signals or other wireless communication, depending on where the wireless device is located.

BRIEF DESCRIPTION OF THE FIGURES

Non-limiting and non-exhaustive features will be described with reference to the following figures, wherein like reference numerals refer to like parts throughout the various figures.

SUMMARY

In an implementation, a process may include estimating a three dimensional trajectory of motion of a mobile device based at least in part on three dimensional sensor measurements performed by at least one sensor at the mobile device; and estimating a location of the mobile device based at least in part on a comparison of the estimated three dimensional trajectory with one or more predetermined candidate three dimensional trajectories. It should be understood, however, that this is merely a particular example of methods disclosed and discussed throughout, and that claimed subject matter is not limited to this particular example.

DETAILED DESCRIPTION

Reference throughout this specification to "one example", "one feature", "an example" or "one feature" means that a particular feature, structure, or characteristic described in connection with the feature and/or example is included in at least one feature and/or example of claimed subject matter. Thus, the appearances of the phrase "in one example", "an example", "in one feature" or "a feature" in various places throughout this specification are not necessarily all referring to the same feature and/or example. Furthermore, the particular features, structures, or characteristics may be combined in one or more examples and/or features.

A satellite positioning system (SPS) may comprise a system of transmitters positioned to enable entities to determine their location on the Earth based, at least in part, on signals received from the transmitters. Such a transmitter may transmit a signal marked with a repeating pseudo-random noise (PN) code of a set number of chips and may be located on ground-based control stations, user equipment and/or space vehicles. In a particular example, such transmitters may be located on Earth orbiting satellites. For example, a satellite in a constellation of a Global Navigation Satellite System (GNSS) such as Global Positioning System (GPS), Galileo, Glonass, or Compass may transmit a signal marked with a PN code that is distinguishable from PN codes transmitted by other satellites in the constellation.

To estimate a position at a receiver, a navigation system may determine pseudorange measurements to satellites "in view" of the receiver using well known techniques based, at least in part, on detections of PN codes in signals received from the satellites. Such a pseudorange to a satellite may be determined based, at least in part, on a code phase detected in a received signal marked with a PN code associated with the satellite during a process of acquiring the received signal at a receiver. To acquire the received signal, such a receiver may correlate the received signal with a locally generated PN code associated with a satellite. For example, such a receiver may correlate such a received signal with multiple code and/or time shifted versions of such a locally generated PN code. Detection of a particular time and/or code shifted version yielding a correlation result with the highest signal power may indicate a code phase associated with the acquired signal for use in measuring pseudorange as discussed above.

In an implementation, a mobile device (MD) may be located in a region having an unfavorable RF environment that prevents the MD from acquiring signals, such as from SPS transmitters, that would otherwise enable a location determination. Furthermore, such an RF environment may prevent an MD from receiving location information via any wireless communication from outside the RF environment. Such a region may include an office building interior, a shopping mall, and/or a subway, just to name a few examples. As an MD moves in such a region, the MD may define a two or three dimensional trajectory of motion, which may be estimated based at least in part on sensor measurements taken at the MD. Such a trajectory may comprise, for example, a two or three-dimensional pattern, or a wire-frame representation, that may represent one possible route taken by an MD. For example, an MD carried by a person may enter a building, travel down a flight of stairs that wraps around from left to right, head in a direction to the left, and proceed down an escalator such as into a subway. The above-described route may comprise one of several possible routes or candidate trajectories for a particular region. The above-described route may also define a unique trajectory pattern. In a particular implementation, a location of an MD may be estimated based at least in part on a comparison of its estimated trajectory pattern (e.g., from sensor measurements) with one or more predetermined candidate trajectory patterns. Accordingly, a location of an MD may be estimated in a region having an unfavorable RF environment that prevents the mobile device from acquiring SPS transmitter signals, for example.

In an implementation, externally-sourced (ES) position information may be provided for an MD by a user and/or determined based at least in part on acquisition of SPS signals at the MD. ES position information may also comprise signals from positioning technologies other than SPS, such as WiFi signals or other Local Area Network (LAN) signals, Bluetooth, or other Personal Area Network (PAN) signals, Ultra-wideband (UWB), Wide Area Network (WAN), digital TV, wireless repeater, RFID, radio-location beacon, and/or cell tower ID, just to name a few examples. Such an acquisition may occur before the MD enters a region that prevents the mobile device from acquiring such ES information, for example. In a particular implementation, ES position information may be used to reduce a number of candidate trajectories to which the MD trajectory of motion may be compared. Some ES position information, such as cell ID, may be less precise than other ES position information, such as SPS signals for example. Less precise ES position information may pinpoint a location of an MD only to within a relatively large area, such as a building, a city block, a state, and so on. For example, ES position information may establish that an MD is located in the city of San Jose, or that the MD is located in or near a subway station in San Francisco's financial district. In the latter case, candidate trajectories may be reduced to particular candidate trajectories to the San Francisco subway station.

Figure 1:
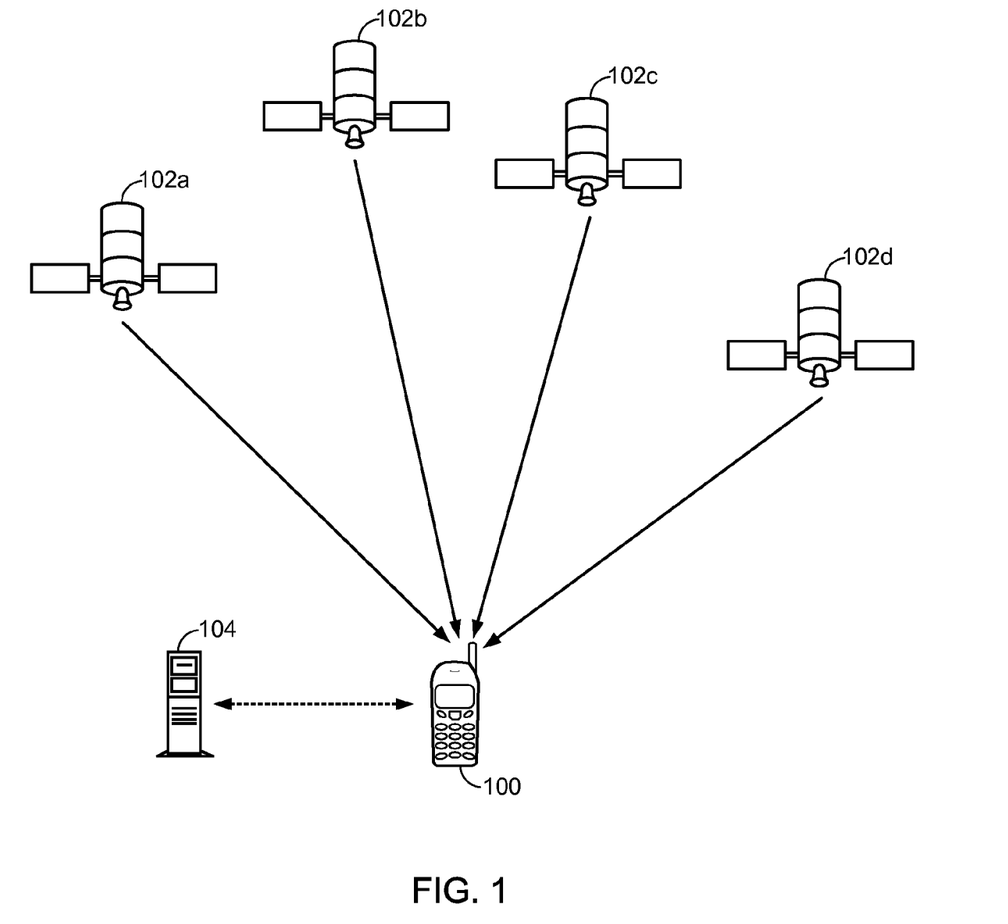
FIG. 1 is a schematic diagram of a satellite positioning system (SPS), according to an implementation.

FIG. 1 illustrates an application of an SPS system, according to an implementation. A mobile device (MD) 100 in a wireless communications system may receive transmissions from satellites 102a, 102b, 102c, and 102d in a line of sight to MD 100 to derive time measurements from four or more of the transmissions. MD 100 may provide such measurements to location server 104, such as a position determination entity (PDE), for example. Location server 104 may estimate a location of MD 100 from such measurements. Alternatively, MD 100 may estimate its own location by utilizing SPS signals, for example. Of course, such an application of an SPS system is merely an example, and claimed subject matter is not so limited. Further, signals of positioning technologies other than SPS may also be used to calculate MD positions. For example, MD 100 may estimate its own location by utilizing other such position technologies, or a location server may be employed as described above.

Figure 2:
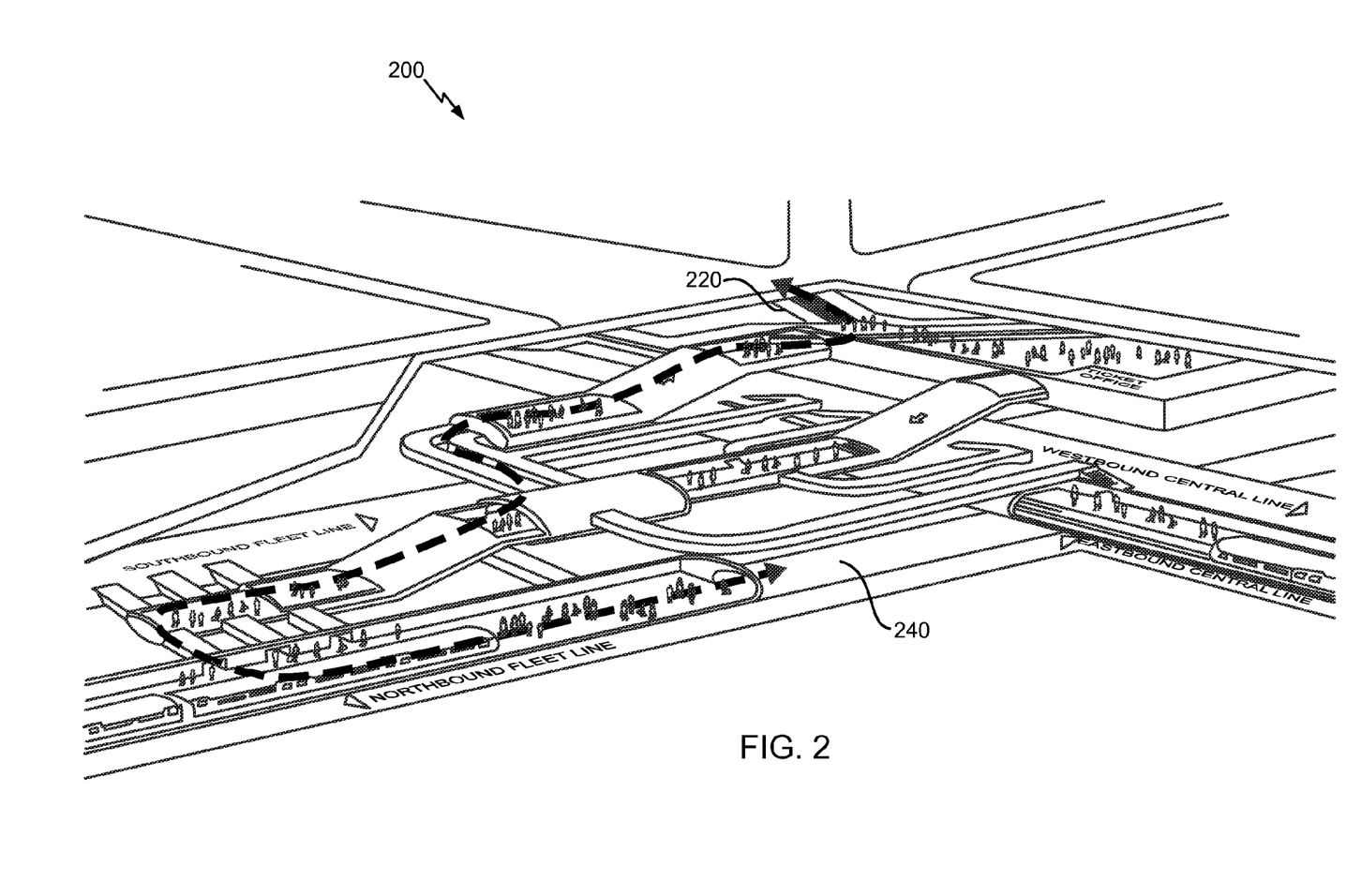
FIG. 2 is a perspective diagram showing possible trajectories for a mobile device, according to an implementation.

FIG. 2 is a perspective diagram showing a region 200 including several possible trajectories for an MD, according to an implementation. As mentioned above, such a region may include an unfavorable RF environment for the MD to acquire signals such as SPS signals. Such a region may include a subway, for example. Region 200 may include one or more aisles, hallways, stairways, escalators, elevators, and/or subway trains, for example. A person carrying an MD may enter region 200 at entrance 220, for example, and then arrive at a choice of one or more possible routes to a destination 240. Two routes, trajectories 480 and 490, among the one or more possibilities are shown in FIG. 4, which will be discussed below.

Figure 3:
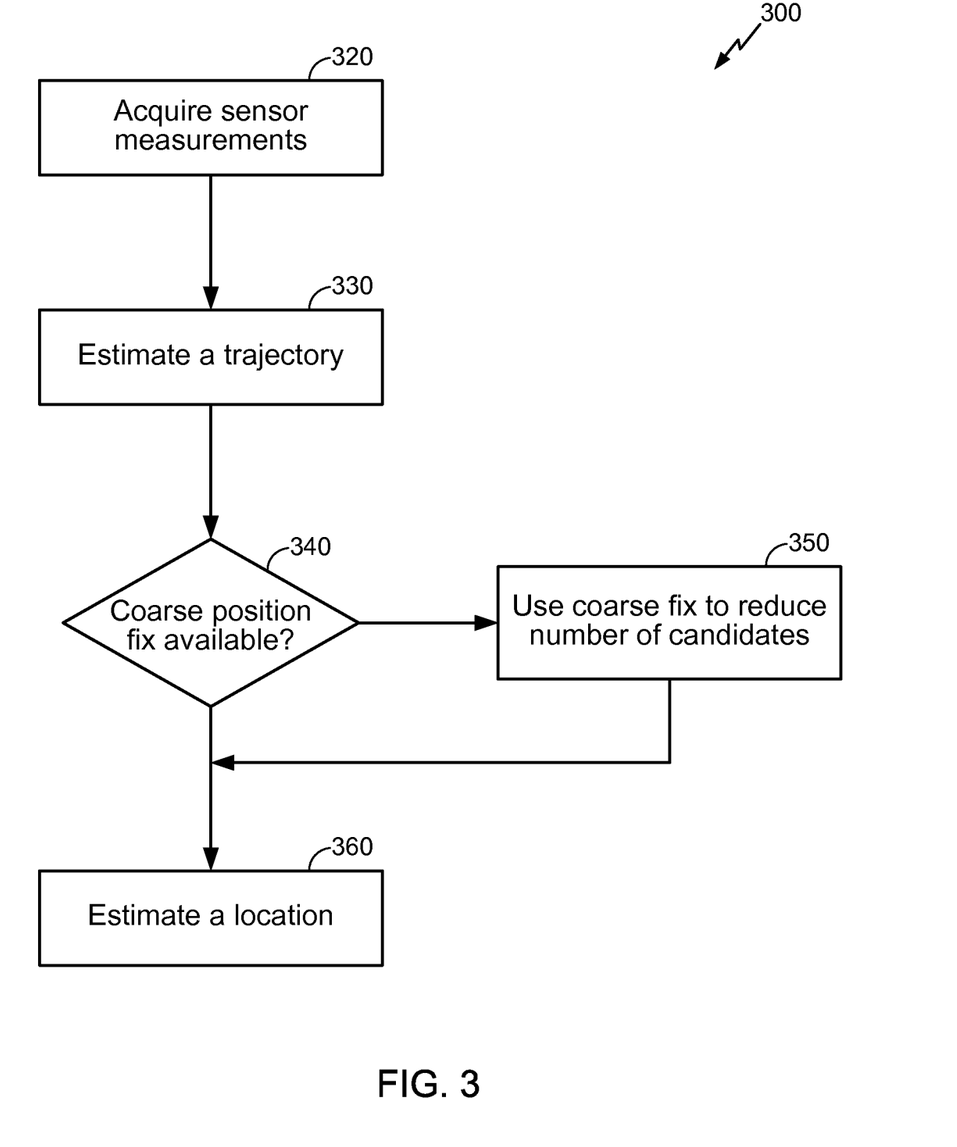
FIG. 3 is a flow diagram of a process for estimating a location of a mobile device, according to an implementation.
Figure 4:
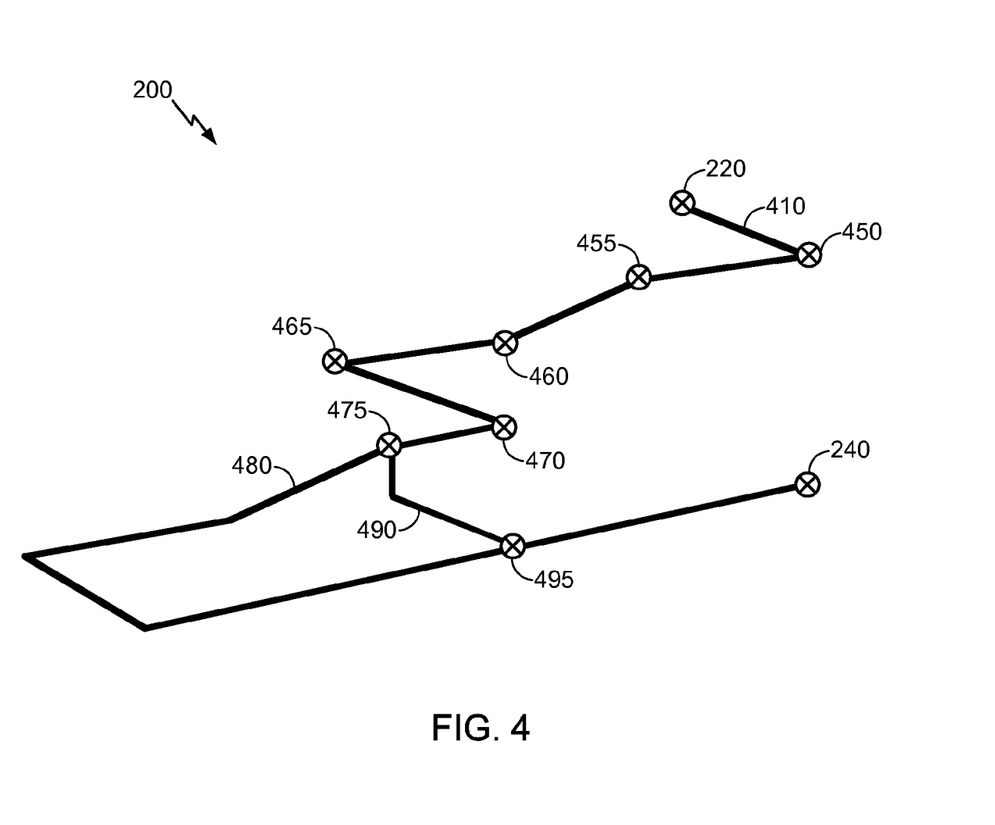
FIG. 4 is a schematic diagram showing possible trajectories for a mobile device, according to an implementation.

FIG. 3 is a flow diagram of a process 300 for estimating a location of an MD and FIG. 4 is a schematic diagram showing trajectories for an MD, according to an implementation. An MD, such as MD 100 shown in FIG. 1 for example, may include a motion sensor 550 (FIG. 5) to obtain sensor measurements, as at block 320 of process 300. Such a motion sensor may include, for example, a multi-axis accelerometer, a multi-axis geomagnetic sensor (compass) and/or a multi-axis gyro. It may also include a barometric pressure sensor. In a particular example, an accelerometer, a compass, and a gyro may comprise 3-axes sensors. Sensor measurements may be used to estimate a current and/or past trajectory of motion of MD 100, as at block 330. For example, referring to FIG. 4, MD 100 may enter region 200 at entrance 220 to begin a three-dimensional trajectory that may be tracked by measuring motion continuously, from time-to-time, and/or periodically along a route 410. Such a route 410, for example, may comprise a displacement followed by a left turn 450, a change in direction 455 at the top of stairs, followed by another change in direction 460 at the bottom of the stairs, a left turn 465, and a right turn 470 followed by a displacement leading to a direction split 475, which may include an escalator and an elevator, for example. In a particular implementation, to determine a trajectory, speed, direction, and/or time span of motion of MD 100 may be measured and/or stored at MD 100. Accordingly, measured displacements and/or changes of direction along route 410 may be used to provide an estimated trajectory. In another particular implementation, MD 100 may be adapted to obtain information from one or more fixed beacons located along route 410. Such beacons may include at least portions of Near-Field Communications (NFC) systems such as radiofrequency identification (RFID) transponders, as well as WiFi signals, Bluetooth signals, UWB signals, WAN signals, digital TV signals, cell tower ID, and/or any devices that may provide MD 100 with a position fix along route 410, for example. Information obtained from such beacons may provide one or more position fixes that, in conjunction with motion sensor measurements, may be used to provide an estimated trajectory of MD 100, for example. Of course, a trajectory may be estimated by a number of ways, and claimed subject matter is not limited to examples described herein.

In an implementation, a database may include predetermined candidate trajectories for one or more regions. In other words, a database may include information regarding possible routes or paths available to a user in a particular region. For example, such a database may include predetermined candidate trajectories for a building, a subway system, a city, a state, and/or a country. Referring again to FIG. 4, location 475 may present a user carrying MD 100 two route choices, one leading to trajectory 480 and the other leading to trajectory 490. In any case, a motion sensor onboard MD 100 may provide measurements to estimate a trajectory of either route that is taken. Accordingly, a database may, for example, include information regarding such trajectories as predetermined candidate trajectories for region 200. Such information may include geographical, directional, and/or displacement information. For example, geographical, directional, and/or displacement information regarding a stairwell as a portion of a route may be stored in a database. In another example, a region including a city may include multiple buildings, each building having hallways, stairs, and/or elevators that provide a relatively large number of possible routes. Though such a large number of possible routes may exist, candidate trajectories in a database may include unique trajectory patterns, though such uniqueness may be limited to a relatively small region, as explained below. For example, trajectory 480 may correspond to a unique pattern of displacements and/or direction changes from location 475 to location 495. Such a trajectory pattern may be unique as shown in region 200 of FIG. 2, since no other portion of route 410 matches the pattern of trajectory 480. Moreover, the pattern of trajectory 480 may be unique among other trajectory patterns within a city region, for example. In other words, among a plurality of possible routes that may be taken in buildings in a city, trajectory 480 may include a unique pattern. Accordingly, the pattern of trajectory 480 may uniquely identify a location of trajectory 480, for which a database may include location information, for example. As may be expected, such uniqueness may not apply as well for a database that includes candidate trajectories for relatively large regions, such as a state or country. Such large regions may include a relatively large number of possible routes and associated trajectory patterns. In such a case, there may be a relatively high likelihood that two different locations coincidentally include matching trajectory patterns. For at least this reason, ES position information to reduce a number of candidate trajectories in a database may be desired, as explained below.

As described above, a database may include predetermined candidate trajectories for regions such as a city that includes multiple buildings, wherein each building may include hallways, stairs, and/or elevators. Furthermore, such a database may include predetermined candidate trajectories for even farther-reaching regions beyond cities, such as a state and/or country. Such a database may therefore include a relatively large amount of data. In an implementation, ES position information, if available to MD 100, may be used to modify and/or reduce a number of candidate trajectories, as at blocks 340 and 350 of process 300. For example, obtaining ES position information may comprise determining a location of MD 100 within a particular city to narrow the number of candidate trajectories from statewide to city-wide. In another example, obtaining ES position information may comprise determining a location of MD 100 within a region near a particular subway to reduce the number of predetermined candidate trajectories from city-wide to those candidate trajectories associated with the particular subway. In one implementation, ES position information may be obtained by MD 100 while MD 100 is in a favorable RF environment to acquire signals, such as SPS signals. Such ES position information may be determined before MD 100 enters an unfavorable RF environment, such as in a subway region, for example. In a particular implementation, MD 100 may download at least a portion of a database of predetermined candidate trajectories for a region at or near a location in which MD 100 is determined to be located via ES position information. In this fashion, MD 100, perhaps having limited storing capability, need only store a portion of a database that is pertinent to the approximate location of MD 100. In another particular implementation, MD 100 may include a pre-stored database of candidate trajectories for a region at or near a location in which MD 100 is determined to be located via ES position information. In yet another particular implementation, depending at least in part on availability of signals such as from SPS transmitters that may enable a location determination of MD 100, ES position information need not be acquired. In such a case, MD 100 may include a memory to store at least a portion of a database of predetermined candidate trajectories having a relatively high probability of encompassing the location where MD 100 may currently operate. For example, such a stored database may be previously established from the last time SPS signals were available to MD 100. In yet another particular implementation, a user may enter location information as ES position information into MD 100. Such user input, such as an address, may be entered, for example, if SPS signals are unavailable to MD 100. In still another example, possible trajectories may be computed by MD 100 with availability of a digital map and/or ES position information. Of course, such ES position information to modify a database is merely an example, and claimed subject matter is not so limited.

Figure 5:
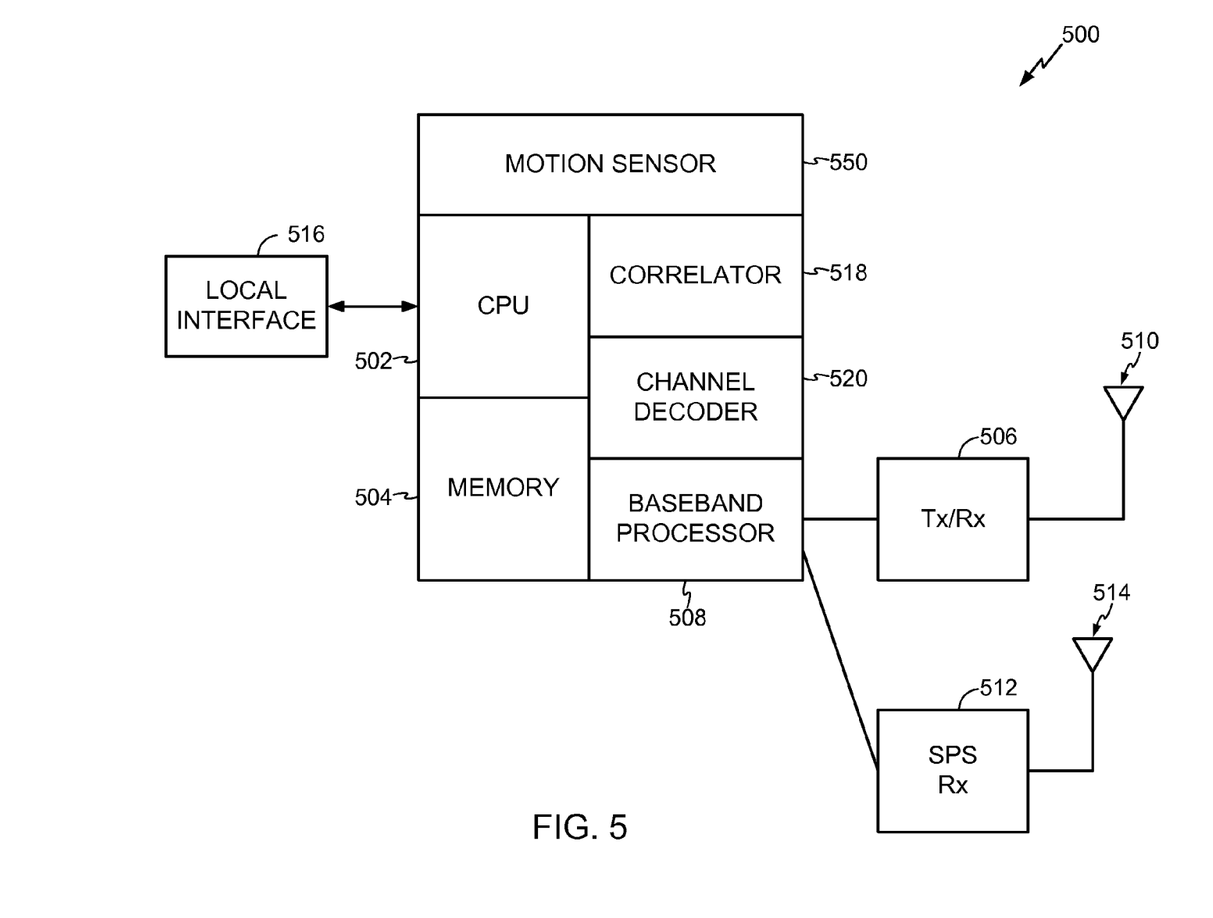
FIG. 5 is a schematic diagram of a mobile device capable of sensing its motion and communicating with a wireless network, according to an implementation.

In a particular implementation, at block 360, a location of MD 100 may be determined based at least in part on a comparison of an estimated trajectory, as measured by motion sensor 550 for example, with one or more predetermined candidate trajectories stored in a database, as explained above. Such a comparison may include analytically matching spatial patterns and/or shapes of two or three dimensional trajectories among candidate trajectories in a database with the trajectory estimated for MD 100. In a particular implementation, spatial pattern matching may include a least square fit analysis of an estimated trajectory for MD 100 with one or more predetermined candidate trajectories maintained in a database, for example. Of course, other methods for analytically comparing trajectories are not limited to a least square fit analysis, and claimed subject matter is not so limited. In one implementation, a location of MD 100 may be determined once such a pattern match is found between that of an estimated trajectory of MD 100 and that of a candidate trajectory, wherein the candidate trajectory may include location information maintained in a database.

FIG. 5 is a schematic diagram of a device capable of communication with a wireless network and sensing its motion, according to one implementation. In a particular implementation, an MS, such as MS 100 shown in FIG. 1, may comprise a device 500 that is capable of processing SPS signals received at an antenna 514 for determining pseudorange measurements and communicating with a wireless communication network through antenna 510. Here, a radio transceiver 506 may be adapted to modulate an RF carrier signal with baseband information, such as data, voice and/or SMS messages, onto an RF carrier, and demodulate a modulated RF carrier to obtain such baseband information. Antenna 510 may be adapted to transmit a modulated RF carrier over a wireless communications link and receive a modulated RF carrier over a wireless communications link.

Baseband processor 508 may be adapted to provide baseband information from central processing unit (CPU) 502 to transceiver 506 for transmission over a wireless communications link. Here, CPU 502 may obtain such baseband information from a local interface 516 which may include, for example, environmental sensory data, motion sensor data, altitude data, acceleration information (e.g., from an accelerometer), proximity to other networks (e.g., ZigBee, Bluetooth, WiFi, peer-to-peer). Such baseband information may also include position information such as, for example, an estimate of a location of device 500 and/or information that may be used in computing same such as, for example, pseudorange measurements and/or ES position information. Such ES position information may also be received from user input, as mentioned above. CPU 502 may be adapted to estimate a trajectory of device 500 based at least in part on measured motion data. CPU 502 may also be able to compute candidate trajectories. Channel decoder 520 may be adapted to decode channel symbols received from baseband processor 508 into underlying source bits.

SPS receiver (SPS Rx) 512 may be adapted to receive and process transmissions from SVs, and provide processed information to correlator 518. Correlator 518 may be adapted to derive correlation functions from the information provided by receiver 512. Correlator 518 may also be adapted to derived pilot-related correlation functions from information relating to pilot signals provided by transceiver 506. This information may be used by device acquire a wireless communications network.

Memory 504 may be adapted to store machine-readable instructions which are executable to perform one or more of processes, examples, implementations, or examples thereof which have been described or suggested. CPU 502 may be adapted to access and execute such machine-readable instructions. However, these are merely examples of tasks that may be performed by a CPU in a particular aspect and claimed subject matter in not limited in these respects. Further, memory 504 may be adapted to store one or more predetermined candidate trajectories, wherein CPU 502 may be adapted to determine a location of device 500 based, at least in part, on a comparison of an estimated trajectory with the one or more predetermined candidate trajectories. In a particular implementation, CPU 502 may be adapted to reduce a number of the one or more predetermined candidate trajectories based at least in part on ES position information.

In an implementation, motion sensor 550 may include one or more transducers to measure a motion of device 500. Such transducers may include an accelerometer, a compass, a pressure sensor, and/or a gyro, for example. Such a motion of device 500 may include a rotation and/or a translation. Measurements of one or more such motions may be stored in memory 504 so that stored measurements may be retrieved for use in determining a trajectory of device 500, as in explained above, for example.

Methodologies described herein may be implemented by various means depending upon applications according to particular features and/or examples. For example, such methodologies may be implemented in hardware, firmware, software, and/or combinations thereof. In a hardware implementation, for example, a processing unit may be implemented within one or more application specific integrated circuits (ASICs), digital signal processors (DSPs), digital signal processing devices (DSPDs), programmable logic devices (PLDs), field programmable gate arrays (FPGAs), processors, controllers, micro-controllers, microprocessors, electronic devices, other devices units designed to perform the functions described herein, and/or combinations thereof.

For a firmware and/or software implementation, methodologies may be implemented with modules (e.g., procedures, functions, and so on) that perform the functions described herein. Any machine-readable medium tangibly embodying instructions may be used in implementing the methodologies described herein. For example, software codes may be stored in a memory, for example the memory of a mobile station, and executed by a processor. Memory may be implemented within the processor or external to the processor. As used herein the term "memory" refers to any type of long term, short term, volatile, nonvolatile, or other memory and is not to be limited to any particular type of memory or number of memories, or type of media upon which memory is stored.

Position determination and/or estimation techniques described herein may be used for various wireless communication networks such as a wireless wide area network (WWAN), a wireless local area network (WLAN), a wireless personal area network (WPAN), and so on. The term "network" and "system" may be used interchangeably herein. A WWAN may be a Code Division Multiple Access (CDMA) network, a Time Division Multiple Access (TDMA) network, a Frequency Division Multiple Access (FDMA) network, an Orthogonal Frequency Division Multiple Access (OFDMA) network, and so on. A CDMA network may implement one or more radio access technologies (RATs) such as cdma2000, Wideband-CDMA (W-CDMA), to name just a few radio technologies. Here, cdma2000 may include technologies implemented according to IS-95, IS-2000, and IS-856 standards. A TDMA network may implement Global System for Mobile Communications (GSM), Digital Advanced Mobile Phone System (D-AMPS), or some other RAT. GSM and W-CDMA are described in documents from a consortium named "3rd Generation Partnership Project" (3GPP). Cdma2000 is described in documents from a consortium named "3rd Generation Partnership Project 2" (3GPP2). 3GPP and 3GPP2 documents are publicly available. A WLAN may comprise an IEEE 802.11x network, and a WPAN may comprise a Bluetooth network, an IEEE 802.15x, for example. Such position determination techniques described herein may also be used for any combination of WWAN, WLAN and/or WPAN.

Techniques described herein may be used with any one of several SPS' and/or combinations of SPS'. Furthermore, such techniques may be used with positioning determination systems that utilize pseudolites or a combination of satellites and pseudolites. Pseudolites may comprise ground-based transmitters that broadcast a PN code or other ranging code (e.g., similar to a GPS or CDMA cellular signal) modulated on an L-band (or other frequency) carrier signal, which may be synchronized with time. Such a transmitter may be assigned a unique PN code so as to permit identification by a remote receiver. Pseudolites may be useful in situations where GPS signals from an orbiting satellite might be unavailable, such as in tunnels, mines, buildings, urban canyons or other enclosed areas. Another implementation of pseudolites is known as radio-beacons. The term "satellite", as used herein, is intended to include pseudolites, equivalents of pseudolites, and possibly others. The term "SPS signals", as used herein, is intended to include SPS-like signals from pseudolites or equivalents of pseudolites.

An entity such as a wireless terminal may communicate with a network to request data and other resources. A mobile device (MD), including a cellular telephone, a personal digital assistant (PDA), or a wireless computer are just a few examples of such an entity. Communication of such an entity may include accessing network data, which may tax resources of a communication network, circuitry, or other system hardware. In wireless communication networks, data may be requested and exchanged among entities operating in the network. For example, an MD may request data from a wireless communication network to determine the position of the MD operating within the network: data received from the network may be beneficial or otherwise desired for such a position determination. However, these are merely examples of data exchange between an MD and a network in a particular aspect, and claimed subject matter in not limited in these respects.

While there has been illustrated and described what are presently considered to be example features, it will be understood by those skilled in the art that various other modifications may be made, and equivalents may be substituted, without departing from claimed subject matter. Additionally, many modifications may be made to adapt a particular situation to the teachings of claimed subject matter without departing from the central concept described herein. Therefore, it is intended that claimed subject matter not be limited to the particular examples disclosed, but that such claimed subject matter may also include all aspects falling within the scope of appended claims, and equivalents thereof.

What is claimed is:

1. A method comprising:
estimating a three dimensional trajectory of motion of a mobile device based at least in part on three dimensional sensor measurements performed by at least one sensor at said mobile device; and
estimating, by the mobile device, a location of said mobile device based at least in part on a comparison of said estimated three dimensional trajectory with one or more predetermined candidate three dimensional trajectories stored at said mobile device, wherein estimating the location of said mobile device includes:
obtaining externally-sourced (ES) position information for said mobile device before the mobile device enters an unfavorable radio-frequency (RF) environment;
using said ES position information in the unfavorable RF environment to reduce a number of said one or more predetermined candidate three dimensional trajectories; and
storing said ES position information during at least a portion of time when said mobile device is located where said ES position information is not available.

2. The method of claim 1, wherein said ES position information is based, at least in part, on Near-Field Communication (NFC) signals, WiFi signals, Bluetooth signals, Ultra-Wideband (UWB) signals, Wide Area Network (WAN) signals, digital TV signals, and/or cell tower ID.

3. The method of claim 1, wherein said ES position information is based at least in part on acquisition of one or more satellite positioning system signals at the mobile device.

4. The method of claim 1, wherein said ES position information is based at least in part on user input.

5. The method of claim 1, wherein said three dimensional trajectory of motion of said mobile device is in an RF environment that does not enable acquisition of satellite position system signals.

6. The method of claim 1, wherein said three dimensional trajectory of motion of said mobile device is in an RF environment that does not enable receipt of location information via wireless communications from outside said RF environment.

7. The method of claim 1, further comprising measuring said three dimensional trajectory of motion of said mobile device using an accelerometer, compass, pressure sensor, and/or a gyro.

8. The method of claim 1, wherein said comparison of said estimated three dimensional trajectory with said one or more predetermined candidate three dimensional trajectories includes a least square fit analysis.

9. A mobile device comprising:
a sensor configured to measure motion of said mobile device;
a processor configured to estimate a three dimensional trajectory of said mobile device based at least in part on said measured motion; and
a memory storing one or more predetermined candidate trajectories,
wherein said processor is further configured to estimate a location of said mobile device based at least in part on a comparison of said estimated three dimensional trajectory with said one or more predetermined candidate three dimensional trajectories stored in said memory, and
wherein said processor is further configured to cause the mobile device to:
obtain externally-sourced (ES) position information for said mobile device before the mobile device enters an unfavorable radio-frequency (RF) environment;
use said ES position information in the unfavorable RF environment to reduce a number of said one or more predetermined candidate three dimensional trajectories; and
store said ES position information during at least a portion of time when said mobile device is located where said ES position information is not available.

10. The mobile device of claim 9, further comprising a receiver configured to operate in an RF environment, wherein the receiver is further configured to:
acquire one or more satellite positioning system (SPS) signals; and
obtain the ES position information before the mobile device enters the unfavorable radio-frequency (RF) environment based, at least in part, on Near-Field Communication (NFC) signals, WiFi signals, Bluetooth signals, Ultra-Wideband (UWB) signals, Wide Area Network (WAN) signals, digital TV signals, and/or cell tower ID.

11. The mobile device of claim 9, wherein said ES position information is based at least in part on user input.

12. The mobile device of claim 9, wherein said motion of said mobile device is in an RF environment that does not support satellite position system signals and wireless communications to said mobile device.

13. The mobile device of claim 9, wherein the sensor is configured to measure the motion of said mobile device using an accelerometer, compass, pressure sensor, and/or a gyro.

14. An article comprising:
a non-transitory storage medium comprising machine-readable instructions stored thereon which, if executed by a computing platform, cause said computing platform to:
estimate a three dimensional trajectory of motion of a mobile device based at least in part on sensor measurements taken at said mobile device;
estimate, at said mobile device, a location of said mobile device based at least in part on a comparison of said estimated three dimensional trajectory with one or more predetermined candidate three dimensional trajectories stored at said mobile device;
obtain externally-sourced (ES) position information for said mobile device before the mobile device enters an unfavorable radio-frequency (RF) environment;
use said ES position information in the unfavorable RF environment to reduce a number of said one or more predetermined candidate three dimensional trajectories; and
store said obtained ES position information during at least a portion of time when said mobile device is located where said ES position information is not available.

15. The article of claim 14, wherein said ES position information is based, at least in part, on Near-Field Communication (NFC) signals, WiFi signals, Bluetooth signals, Ultra-Wideband (UWB) signals, Wide Area Network (WAN) signals, digital TV signals, and/or cell tower ID.

16. The article of claim 14, wherein said ES position information is based at least in part on acquisition of one or more satellite positioning system signals at the mobile device.

17. The article of claim 14, wherein said three dimensional trajectory of motion of said mobile device occurs in an RF environment that does not enable acquisition of satellite position system signals.

18. The article of claim 14, wherein said three dimensional trajectory of motion of said mobile device occurs in an RF environment that does not enable receipt of location information via wireless communications from outside said RF environment.

19. The article of claim 14, wherein said instructions, if executed by said computing platform, further cause said computing platform to measure said three dimensional trajectory of motion of said mobile device using an accelerometer, compass, pressure sensor, and/or a gyro.

20. An apparatus comprising:
   means for estimating a three dimensional trajectory of motion of a mobile device based at least in part on sensor measurements taken at said mobile device;
   means for estimating, at the mobile device, a location of said mobile device based at least in part on a comparison of said estimated three dimensional trajectory with one or more predetermined candidate three dimensional trajectories stored at said mobile device;
   means for obtaining ES position information for said mobile device before the mobile device enters an unfavorable radio-frequency (RF) environment;
   means for using said ES position information in the unfavorable RF environment to reduce a number of said one or more predetermined candidate three dimensional trajectories; and
   means for storing said obtained ES position information during at least a portion of time when said mobile device is located where said ES position information is not available.

21. The apparatus of claim 20, wherein said ES position information is based, at least in part, on Near-Field Communication (NFC) signals, WiFi signals, Bluetooth signals, Ultra-Wideband (UWB) signals, Wide Area Network (WAN) signals, digital TV signals, and/or cell tower ID.

22. The apparatus of claim 20, wherein said ES position information is based at least in part on acquisition of one or more satellite positioning system signals at the mobile device.

23. The apparatus of claim 20, wherein said three dimensional trajectory of motion of said mobile device is in an RF environment that does not enable acquisition of satellite position system signals.

24. The apparatus of claim 20, wherein said three dimensional trajectory of motion of said mobile device is in an RF environment that does not enable receipt of location information via wireless communications from outside said RF environment.

25. The apparatus of claim 20, further comprising means for measuring said three dimensional trajectory of motion of said mobile device using an accelerometer and/or a gyro.

26. The apparatus of claim 20, further comprising means for measuring said three dimensional trajectory of motion of said mobile device using a compass and/or a pressure sensor.

* * * * *